United States Patent
Jun et al.

(10) Patent No.: US 9,594,569 B2
(45) Date of Patent: Mar. 14, 2017

(54) APPARATUS AND METHOD FOR BOOTING

(71) Applicant: Samsung Electronics Co., Ltd., Suwon-si, Gyeonggi-do (KR)

(72) Inventors: Haesik Jun, Seoul (KR); Pilsung Koh, Yongin-si (KR); Jeongjae Park, Seoul (KR); Seungwoo Seo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 544 days.

(21) Appl. No.: 14/151,238

(22) Filed: Jan. 9, 2014

(65) Prior Publication Data
US 2014/0200860 A1  Jul. 17, 2014

(30) Foreign Application Priority Data

Jan. 11, 2013 (KR) .................. 10-2013-0003627

(51) Int. Cl.
*G06F 9/44* (2006.01)
(52) U.S. Cl.
CPC .......... *G06F 9/4401* (2013.01); *G06F 9/4418* (2013.01)
(58) Field of Classification Search
USPC .............................. 703/22, 24; 711/103, 118
See application file for complete search history.

(56) References Cited

U.S. PATENT DOCUMENTS

| 9,081,692 | B2 * | 7/2015 | Kato ................... G06F 12/0891 |
| 2003/0126242 | A1 | 7/2003 | Chang |
| 2007/0277051 | A1 | 11/2007 | Reece et al. |
| 2008/0162920 | A1 | 7/2008 | Wilson |
| 2009/0172379 | A1 | 7/2009 | Rothman et al. |
| 2012/0084547 | A1 | 4/2012 | Jung et al. |
| 2012/0101996 | A1 | 4/2012 | Lim et al. |
| 2012/0131320 | A1 | 5/2012 | Park et al. |
| 2012/0303874 | A1 * | 11/2012 | Yamaguchi ......... G06F 12/1009 711/103 |
| 2014/0122803 | A1 * | 5/2014 | Kato ..................... G06F 9/4418 711/118 |

FOREIGN PATENT DOCUMENTS

EP  2 487 583 A1  8/2012
KR  10-2012-0055352 A  5/2012

OTHER PUBLICATIONS

Improving Linux Startup Time Using Software Resume (and other techniques),Hiroki Kaminaga Sony Corporation, Proceedings of the Linux Symposium, vol. Two, Jul. 19-22, 2006, Ottawa, Ontario, Canada.

* cited by examiner

*Primary Examiner* — Thai Phan
(74) *Attorney, Agent, or Firm* — Jefferson IP Law, LLP

(57) ABSTRACT

A method and device for a booting that can reduce a booting time is provided. The method includes loading a snapshot image from a non-volatile memory, setting an initialization of a device, decompressing the loaded snapshot image while the device is initialized, and loading another snapshot image from the non-volatile memory while decompressing the loaded snapshot image.

13 Claims, 5 Drawing Sheets

APPARATUS AND METHOD FOR BOOTING

CROSS-REFERENCE TO RELATED APPLICATION(S)

This application claims the benefit under 35 U.S.C. §119(a) of a Korean patent application filed on Jan. 11, 2013 in the Korean Intellectual Property Office and assigned Serial No. 10-2013-0003627, the entire disclosure of which is hereby incorporated by reference.

TECHNICAL FIELD

The present disclosure relates to an apparatus and a method for a booting which reduce a booting time. More particularly, the present disclosure relates to reducing booting time through parallel procedures.

BACKGROUND

As performance of embedded devices increases to satisfy the diverse needs of users, the size of an operating system that can support such diverse functions such also increases. Accordingly, a kernel size of the operating system and a size of a software platform are also increased. The large kernel size and the software platform may increase booting time of the device. This is because an initialization routine and a file loading occur frequently as the size of the kernel and the software platform increases. Thus, it may cause an inconvenience for the user to wait for a long time until the user is able to use a system, and a long booting time may also cause a problem of missing an actual use point of time of the system.

As a method to address the slow system booting, a Kernel Hibernation (which is a snapshot booting method provided by a Linux Kernel) is suggested. According to the Kernel Hibernation method, a state of a RAM in the termination point, and state information of a CPU and a device are stored and terminated in a non-volatile storing device such as a disk or a flash memory. In addition, in the next booting, the stored state information after the Kernel performs a general initialization procedure is loaded and restored to the volatile storing device to implement fast booting. The stored state information may be referred to as a snapshot image. The Kernel Hibernation may include procedures unnecessary to the Kernel initialization, a snapshot image restoration, and a state restoration of the devices.

A Boot loader snapshot booting method is a method of restoring a snapshot image from the boot loader and then restoring the state of the devices and waking a processor to implement a fast booting by removing those unnecessary procedures. When storing and restoring the snapshot image, an image compression and decompression is performed, if necessary.

FIG. 1 is a flowchart of a boot loader snapshot booting according to the related art.

Referring to FIG. 1, a snapshot image is loaded, at operation 10, from a non-volatile storing device in the boot loader to a volatile storing device. If necessary, the snap shot image is decompressed at operation 20, and the state of the devices is restored and the device wakes at operation 30.

Therefore, a performance time of each procedure is included in the booting time, such that the booting time is increased.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for a booting capable of reducing a booting time by performing a series of procedures in parallel which is performed sequentially at the time of a snapshot booting in a boot loader.

In accordance with an aspect of the present disclosure, a method for a booting is provided. The method includes loading a snapshot image from a non-volatile memory, setting an initialization of a device, decompressing the loaded snapshot image while the device is initialized, and loading another snapshot image from the non-volatile memory while decompressing the loaded snapshot image.

In accordance with another aspect of the present disclosure, an apparatus for a booting is provided. The apparatus includes a non-volatile memory, a memory loading unit configured to load a snapshot image from the non-volatile memory, and a controller configured to set an initialization of a device, and to decompress the loaded snapshot image during the initialization of the device, wherein the memory loading unit loads another snapshot image from the non-volatile memory while the loaded snapshot image is decompressed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A booting apparatus or a booting method which is described in the present disclosure may be applied to various terminals, such as a mobile phone, a smart phone, a laptop computer, a netbook, a digital broadcasting terminal, a Personal Digital Assistants (PDA), a Portable Multimedia Player (PMP), a navigation, a digital TV, a desktop computer, a Camcorder, a digital camera, and a MP3 player, and the like that require a booting when the power is turned on; however, the booting device is not limited to these examples.

Figure 1:
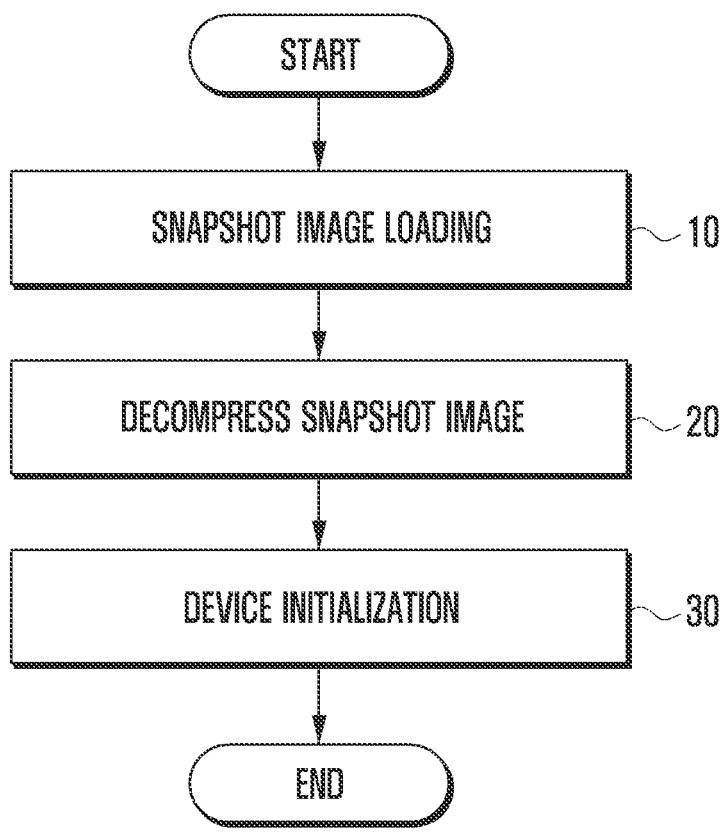
FIG. 1 is a flowchart of a boot loader snapshot booting according to the related art.
Figure 2:
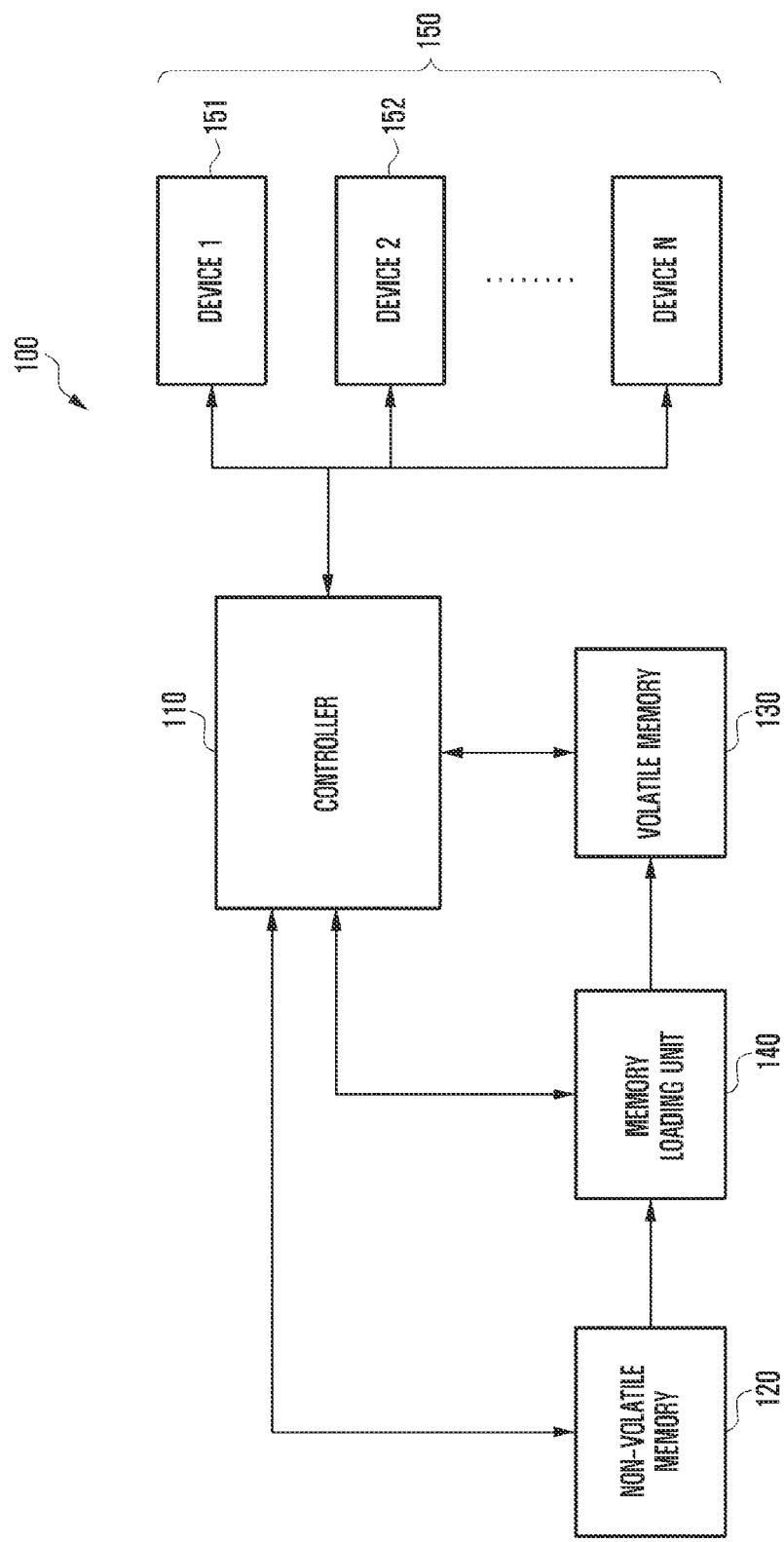
FIG. 2 is a block diagram of a booting device according to an embodiment of the present disclosure.

FIG. 2 is a block diagram of a booting apparatus related to an embodiment of the present disclosure.

Referring to FIG. 2, the booting apparatus 100 may include a controller 110, a non-volatile memory 120, a volatile memory 130, and a memory loading unit 140. The booting apparatus may also include additional elements not shown in FIG. 2 for clarity.

A snapshot image may be stored in the non-volatile memory 120 of the booting apparatus 100. The snapshot image may include at least a part of a processor state of a point where the performing processors are stopped, various memory materials, register values, and state information of an input/output device. In addition, the snapshot image may be split into a plurality of blocks and compressed.

The non-volatile memory 120 is a storage medium which may store a data in the long term even while the power supply is discontinued, and may include at least one of a NAND flash, a NOR flash, an HDD, a SDD, or a storage device having similar properties. A program for a processing and a controlling the controller 110 may be stored in the non-volatile memory 120. In addition, a separate boot loader area for the booting according to the present disclosure may be arranged in the non-volatile memory 120.

When the booting apparatus 100 boots, the snapshot image stored in the non-volatile memory 120 may be loaded to a volatile memory 130. The volatile memory 130 is a memory where the stored data is deleted when the power is turned off, and its data processing speed is fast compare to the non-volatile memory 120. Accordingly, when the snapshot image is loaded to the volatile memory 130, the booting apparatus 100 is able to perform fast booting. For example, the volatile memory 130 may be a Random Access Memory (RAM) and a Static Random Access Memory (SRAM), and the like.

When the booting apparatus 100 boots, the memory loading unit 140 loads the snapshot image stored in the non-volatile memory 120. The loaded snapshot image may be stored in the volatile memory 130.

According to an embodiment of the present disclosure, the memory loading unit 140 may include a Direct Memory Access (DMA) 145. The DMA 145 may control data transmission between the non-volatile memory 120 and the volatile memory 130 without the assistance of the controller 110. In this case, the controller 110 may first generate a signal controlling the snapshot image stored in the non-volatile memory 120 to be loaded to the volatile memory 130 in the DMA 145 when the booting starts. The DMA set signal may include information indicating a snapshot image block which is to be loaded first when the snapshot image stored in the non-volatile memory 120 is split into a plurality of blocks to be stored. The DMA 145 may load the snapshot image stored in the non-volatile memory 120 to the volatile memory 130 to achieve booting without involvement of the controller 110 according to the DMA setting signal received from the controller 110.

The controller 110 usually controls an overall operation of the booting apparatus 100. For example, the controller 110 may control to store the snapshot image from the point where the performing processors are stopped in the non-volatile memory 120. Thereafter, when the booting is performed, the controller 110 may control the booting apparatus 100 to achieve fast booting by restoring a register value and various memory data by using the snapshot image stored in the non-volatile memory 120.

In this case, the controller 110 may set an initialization of the devices 150 which are necessary for the booting. The controller 110 may set an initialization value of the related device to achieve the initialization of the device necessary for the booting procedure and deliver to each device sequentially. The controller 110 transmits the initialization value of the device set to achieve the initialization of the related device to the device, and waits on standby until the initialization of the device is completed.

The devices 150 may include a CPU cache, an IRQ, a timer, an ACD, a PWM, a GPIO, a SPI, an I2C, a NAND, a SDIO, a USB, an hsmmc, a key, an LCD controller, a frame buffer, a pre-processor core (pp_core), a pre-processor sensor interface (pp_ssif), a camera sensor, an Enhanced Processor (EP), a JPEG, a Bayer Engine (BE), an IPCm, an IPCs, an audio, a lens, and the like.

While the initialization of the device is processing, the controller 110 may decompress the compressed snapshot image when the snapshot image which is loaded from the non-volatile memory 120 is compressed. In other words, the initialization of the device and the decompression of the snapshot image may be performed in parallel simultaneously.

In addition, while decompressing the loaded snapshot image, a snapshot image which is different from the decompressed snapshot image is loaded to the volatile memory 130 from the non-volatile memory 120 by the memory loading unit 140. The decompression of the snapshot image by the controller 110 and the loading of the snapshot image different from the decompressed snapshot image by the memory loading unit 140 may be achieved in parallel simultaneously.

Finally, in the booting apparatus 100, after the initialization setting of the device 150 is achieved in the controller 110, during the standby time of the controller 110 while the device 150 is being initialized, the controller 110 decompresses a snapshot image which is loaded to be stored in the volatile memory 130, and, in the memory loading unit 140, simultaneously load the snapshot image different from the decompressed snapshot image to the volatile memory 130 from the non-volatile memory 120 in parallel.

Accordingly, as the initialization of the device, a decompression of the snapshot image, and the snapshot image loading are performed in parallel, a fast booting may be performed in the booting apparatus 100.

A procedure loading the snapshot image from the non-volatile memory 120, a procedure setting the initialization of the device 150, a procedure decompressing the loaded snapshot image during the initialization of the device 150, and a procedure loading a different snapshot image from the non-volatile memory 120 during the decompression of the loaded snapshot image by the memory loading unit 140 may be performed in the boot loader. As the above procedures are performed in the boot loader, the faster booting may be performed.

A procedure where a booting is achieved in the booting apparatus 100 according to the present disclosure is described below with references to FIGS. 3 to 5.

Figure 3:
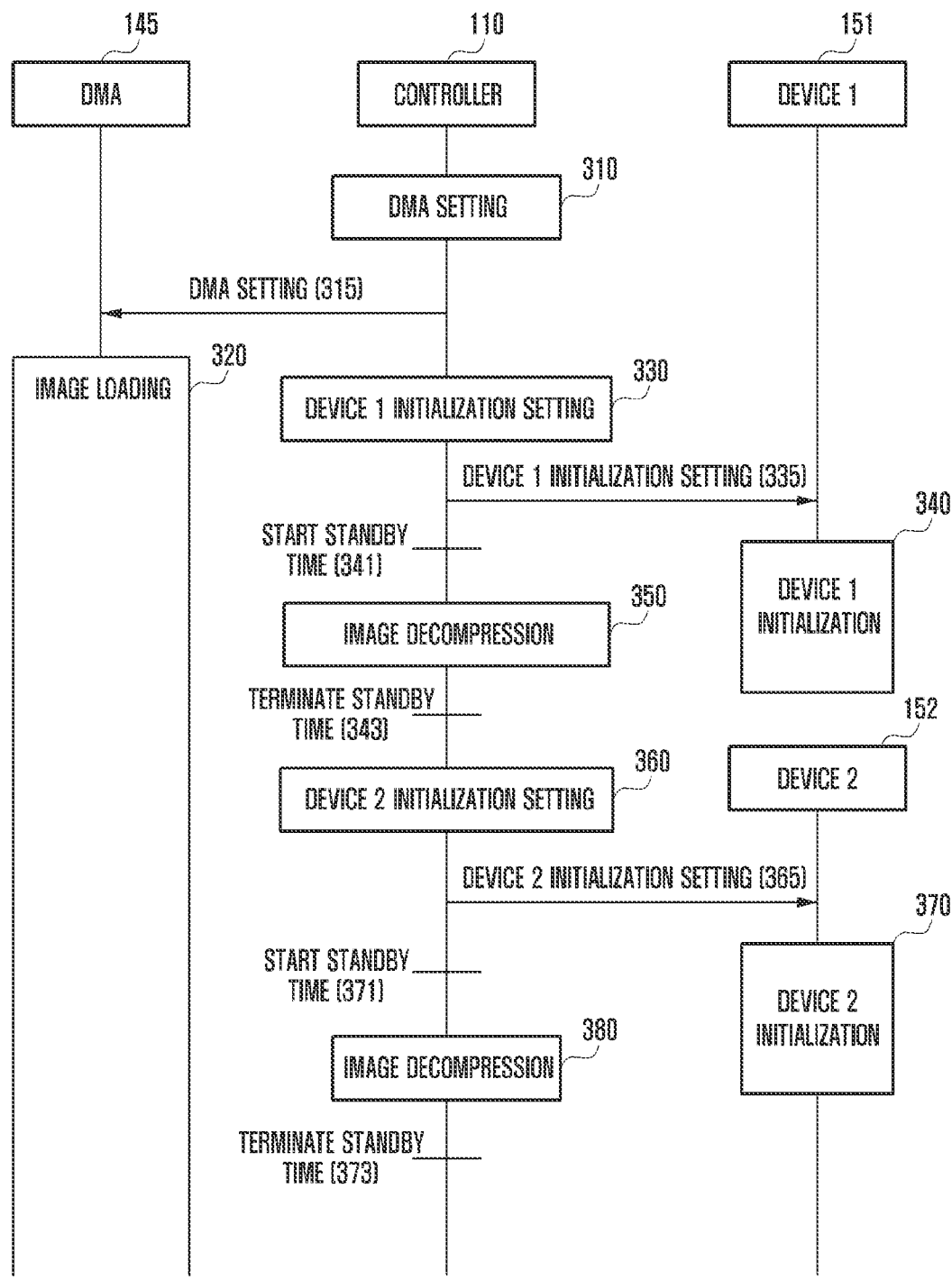
FIG. 3 is a flowchart illustrating a procedure of performing a booting in a booting device according to an embodiment of the present disclosure.

FIG. 3 is a flowchart illustrating a procedure in which a booting is performing in a booting device according to an embodiment of the present disclosure.

Referring to FIG. 3, the controller 110 may perform a DMA setting at operation 310. The DMA setting signal is a control signal for loading the snapshot image stored in the non-volatile memory 120 by the DMA 145 without control of the controller 145. The DMA setting signal may be transmitted to the DMA 145 at operation 315.

The DMA 145 loads the snapshot image stored in the non-volatile memory 120 to the volatile memory 130 according to the DMA setting signal, at operation 320. The DMA setting signal may include information indicating a snapshot image block which is to be loaded first when the snapshot image stored in the non-volatile memory 120 is split into a plurality of blocks to be stored. The DMA 145 may load the snapshot image stored in the non-volatile memory 120 to the volatile memory 130 without involvement of the controller 110 according to the DMA setting signal received from the controller 110.

In the embodiment described with reference to FIG. 3, the DMA 145 is described as an example of the memory loading unit 140 which can load the snapshot image from the non-volatile memory 120; however, the memory loading unit 140 is not limited thereto.

The controller 110 sets the initialization of a first device 151 after transmitting the DMA setting signal to the DMA 145, at operation 330. The controller 110 transmits an initialization value of the first device 151 set for the initialization of the related first device 151 to the first device 151, and waits until the initialization of the first device 151 is completed, at operation 335.

During the standby time of setting the initialization of the first device 151, when a snapshot image block which requires the decompression exists as it is compressed among the snapshot images loaded by the DMA 145, the controller 110 may decompress the compressed snapshot image block, at operation 350.

The standby time may begin at operation 341 and end at operation 343 when the initialization of the device 151 is completed. The decompression of the loaded snapshot image block by the controller 110 may be achieved between the starting point 341 and the termination point 343. Once the standby time starts, the decompression of the loaded snapshot image block may be started. In addition, when the standby time is completed, the decompression of the loaded snapshot image may be stopped.

In addition, although not illustrated, according to an embodiment of the present disclosure, when the decompression of the loaded snapshot image block in which the decompression is in progress is not completed although the initialization of the first device 151 is completed, the decompression may be performed continuously without stopping the decompression of the snapshot image.

The DMA 145 may load a snapshot image different from the snapshot image decompressed by the controller 110 from the non-volatile memory 120.

In a booting method according to an embodiment, a loading of the snapshot image by the DMA 145, the initialization 340 of the first device, and the snapshot image decompression 350 may be performed in parallel, such that the booting time is reduced to achieve a fast booting.

In addition, several standby times may occur during the initialization for one device. For example, in the initialization of the first device, when the initialization for the first device is stopped and the device initialization setting command of the controller 110 is input after the initialization for a certain area of the first device has begun, the initialization for the remaining areas of the first device may resume at operation 340.

When the initialization of the first device 151 is completed at operation 340, the controller 110 may set the initialization of the second device 152 which requires the initialization when booting, at operation 360. The initialization signal set as described above is transmitted to the second device 152 at operation 365, and the initialization of the second device 152 begins at operation 370.

After transmitting the initialization setting signal of the second device 152 to the second device 152 at operation 365, the controller 110 may decompress the loaded snapshot image during the standby time in which the initialization of the second device 152 is achieved, at operation 380. As described above, the decompression of the loaded snapshot image may be achieved between the starting point 371 and the termination point 373 of the standby time.

For example, when the standby time is started at operation 371, the decompression of the snapshot image block loaded by the DMA 145 may be started, and the decompression of the loaded snapshot image may be stopped when the standby time is terminated. In addition, as described above, the decompression of the snapshot image block between the starting point 341 of the previous standby time and the termination point 343, for example, during the procedure of the decompression at operation 350 may be stopped because the initialization of the first device 151 is completed and the standby time is terminated.

In this case, the controller 110 may resume the decompression of the snapshot image block in which the decompression is stopped at the previous standby time at the starting point 371 of the standby time due to the initialization of the second device 152. Although not shown, when the snapshot image is not decompressed even after the termination point 373 of the standby time is not completed, the decompression may be continuously performed.

The controller sets the initialization for the next device, and may perform the decompression of the snapshot image by the same procedure during the initialization of the device.

The above described booting method may be performed in the boot loader, and much faster booting may be achieved.

Figure 4:
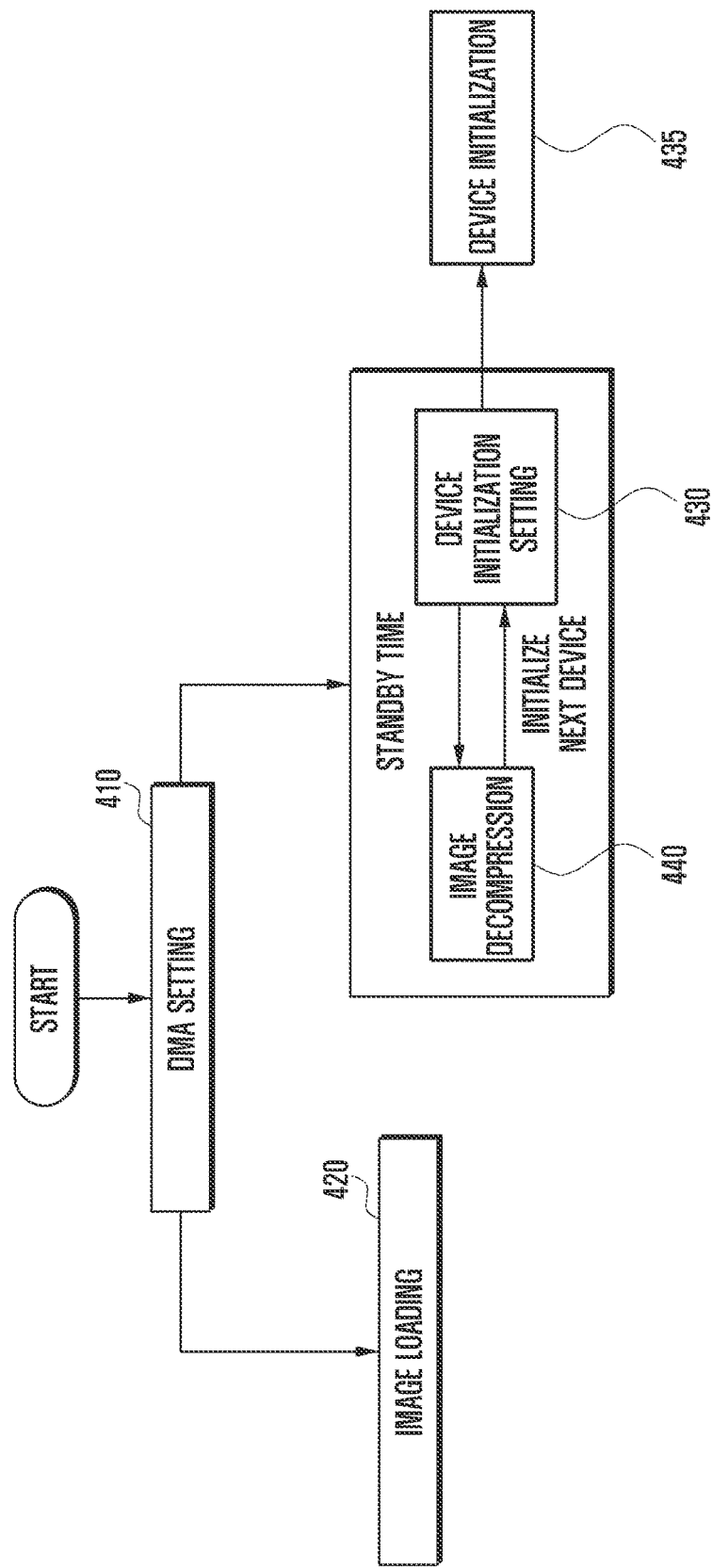
FIG. 4 is a flowchart schematically illustrating a procedure of performing booting in a booting device according to an embodiment of the present disclosure.

FIG. 4 is a flowchart schematically illustrating a procedure of performing a booting in a booting device according to an embodiment of the present disclosure.

Referring to FIG. 4, the controller 110 generates a signal instructing to load the snapshot image stored in the non-volatile memory 120 by the DMA 145 to the volatile memory 130, at operation 410. The DMA 145 receives the generated DMA signal and loads the snapshot image to the volatile memory 130 to store, at operation 420.

In addition, the controller 110 instructs a loading of the snapshot image to the DMA 145, and sets the initialization of the devices 150 necessary for the booting of a computer system, at operation 430. The initialization signal of the set device is transmitted to the device, and the initialization of the device occurs sequentially, at operation 435. While the device is being initialized, the controller 110 is in standby. During this standby time, the controller 110 may perform the decompression of the snapshot image which is loaded to the volatile memory 130 by the DMA 145, at operation 440.

While the snapshot image is decompressed by the controller 110, the DMA 145 may load the snapshot image different from the decompressed snapshot image from the non-volatile memory 120.

When the initialization of the device, which is performing the initialization, is completed, the controller 110 may stop the decompression of the snapshot image. In addition, the controller 110 may continue the decompression of the snapshot image which is currently being decompressed even after the initialization of the device is completed.

After the stop or completion of the snapshot image decompression, the controller 110 may set the initialization of the next device. The initialization of the device is progressed as the initialization signal of the set device is transmitted to the related device. After instructing the initialization for the next device, the controller 110 may perform the decompression of the snapshot image during the standby time until the initialization of the device is completed.

The decompression of the snapshot image which was stopped before may be resumed, and the decompression of a new snapshot image may be performed when the snapshot image which was stopped does not exist.

When the initialization of the device is completed, the controller 110 may perform the decompression of the next device, and perform a process of decompressing the snapshot image similarly to the above described procedure.

Figure 5:
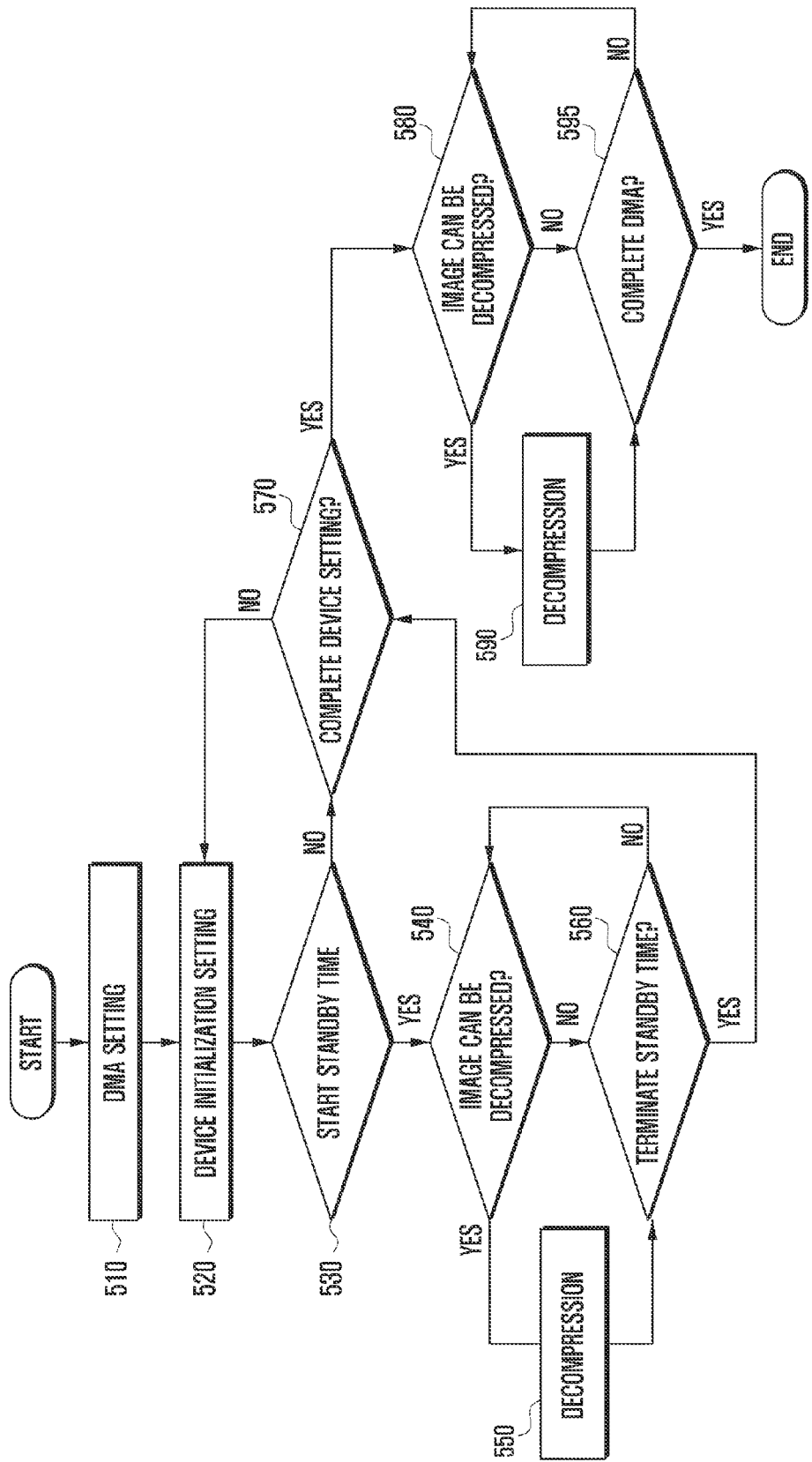
FIG. 5 is a flowchart illustrating an operation of a controller of a booting device according to an embodiment of the present disclosure.

FIG. 5 is a flowchart illustrating an operation of a controller of a booting apparatus according to an embodiment of the present disclosure.

Referring to FIG. 5, the controller 110 instructs the DMA 145 to load the snapshot image stored in the non-volatile memory 120 to the volatile memory 130, at operation 510.

The controller 110 sets the initialization for the device 150 necessary for the booting, at operation 520. The initialization signal of the set device is transmitted to the device, and the controller 110 may determine whether the standby time during when the initialization of the device is progressed is started, at operation 530.

When it is determined that the standby time is started, the controller 110 may determine whether one of the snapshot images loaded by the DMA 145 can be decompressed, at operation 540. When there is a snapshot image block which can be decompressed, the controller 110 begins the decompression at operation 550, and may determine whether the standby time is terminated when the decompression is completed at operation 560. When it is determined that no snapshot image block can be decompressed at operation 540, the controller determines whether to decompress another snapshot image block or complete the decompression by determining whether the standby time is completed, at operation 560. When it is determined that the standby time is not completed, the controller 110 determines whether there is another snapshot image block which can be decompressed, and may begin the decompression of the snapshot image according to operation 550.

When it is determined that the standby time is terminated, the controller 110 may determine whether the initialization setting of all devices is completed at operation 570. When the initialization setting of all devices is not completed, the controller 110 sets the initialization of the device which does not set the initialization, at operation 520. After that, the controller 110 may perform operations 530 to 570 in the same method as described above.

When it is determined that the initialization of all devices is completed, the controller may determine whether any of the loaded snapshot image blocks can be decompressed at operation 580. The controller 110 may continue to decompress the snapshot image block until all loaded snapshot image blocks are decompressed.

When there is snapshot image block which can be decompressed, the controller 110 may perform the decompression of the snapshot image block, at operation 590. On the other hand, when no snapshot image block can be decompressed, the controller 110 may verify whether the operation of the DMA 145 is completed, at operation 595. In other words, the controller 110 may verify whether the loading of the snapshot image stored in the non-volatile memory 120 by the DMA 145 is completed.

According to an embodiment of the present disclosure, the DMA 145 may notify the controller 110 that the loading of the snapshot images is completed when the loading of the snapshot images is completed. The controller 110 may verify that the operation of the DMA 145 is completed when receiving the notice of snapshot image loading completion from the DMA 145.

When it is determined that the snapshot image loading of the DMA 145 is not completed, the controller 110 verifies whether the decompression for the snapshot image block which is additionally loaded is possible, at operation 580, and may perform the decompression of the snapshot image block which can be decompressed, at operation 590.

When it is determined that the snapshot image loading of the DMA 145 is completed, the controller 110 may terminate the booting procedure as the booting of the booting apparatus 100 is completed, at operation 595.

In addition, according to an embodiment of the present disclosure, the above described method is able to be implemented by a computer readable code where the program is recorded. The non-transitory computer readable medium includes all kinds of recording devices where a data readable by a computer system is stored. Examples of the computer readable medium include ROM, RAM, CD-ROMs, magnetic tape, floppy disks, optical data storing devices, and the like.

The booting apparatus and the booting method according to an embodiment of the present disclosure may reduce the booting time as the snapshot image loading, the decompression of the snapshot image, and the initialization of the device are achieved in parallel.

The effect which may obtain from the present disclosure is not limited to the effects described above, and other non-described effects may be clearly understood to those who have ordinary skills in the technical field belongs to the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for booting, the method comprising;
loading a snapshot image from a non-volatile memory;
setting an initialization of a device;
decompressing the loaded snapshot image during a standby time of a controller according to the initialization of the device; and
loading another snapshot image from the non-volatile memory while decompressing the loaded snapshot image.

2. The method of claim 1, wherein the decompressing of the loaded snapshot image during the standby time comprises:
resuming a decompression of the loaded snapshot image when the standby time starts.

3. The method of claim 2, wherein the decompressing of the loaded snapshot image during the standby time further comprises:
stopping a decompression of the loaded snapshot image when the standby time ends.

4. The method of claim 3, further comprising:
decompressing the snapshot image when the decompression of the snapshot image is not completed, after the initialization of the device is completed.

5. The method of claim 1, further comprising:
loading the snapshot image from the non-volatile memory;
setting the initialization of the device;
decompressing the loaded snapshot image while the device is being initialized; and
loading another snapshot image from the non-volatile memory while decompressing the loaded snapshot image,
wherein the method for booting is performed in a boot loader.

6. The method of claim 1, wherein the loading of the snapshot image comprises:
loading a snapshot image from a non-volatile memory by Direct Memory Access (DMA).

7. An apparatus for booting, the apparatus comprising;
a non-volatile memory;
a memory loading unit configured to load a snapshot image from the non-volatile memory; and
at least one processor configured to:
set an initialization of a device, and
decompress the loaded snapshot image during a standby time of the at least one processor according to the initialization of the device,
wherein the memory loading unit loads another snapshot image from the non-volatile memory while the loaded snapshot image is decompressed.

8. The apparatus of claim 7, wherein the at least one processor is further configured to resume the decompression of the loaded snapshot image when the standby time is started.

9. The apparatus of claim 8, wherein the at least one processor is further configured to stop the decompression of the loaded snapshot image when the standby time is terminated.

10. The apparatus of claim 9, wherein the at least one processor is further configured to perform the decompression of the snapshot image when the decompression of the snapshot image is not completed after the initialization of the device is completed.

11. The apparatus of claim 7, wherein the loading of the snapshot image from the non-volatile memory by the memory loading unit, the loading of the another snapshot image from the non-volatile memory during when the loaded snapshot image is decompressed, and the setting of the initialization of the device and the decompression of the loaded snapshot image during the initialization of the device are performed in a boot loader.

12. The apparatus of claim 7, wherein the memory loading unit is Direct Memory Access (DMA).

13. A non-transitory computer-readable recording medium having recorded thereon a program for executing a booting method, the method comprising:
loading a snapshot image from a non-volatile memory;
setting an initialization of a device;
decompressing the loaded snapshot image during a standby time of a controller according to the initialization of the device; and
loading another snapshot image from the non-volatile memory while decompressing the loaded snapshot image.

* * * * *